United States Patent
Harrington et al.

(10) Patent No.: US 10,800,542 B2
(45) Date of Patent: Oct. 13, 2020

(54) RAM AIR TURBINE BLADES

(71) Applicant: Hamilton Sundstrand Corporation, Charlotte, NC (US)

(72) Inventors: Erik Harrington, Machesney Park, IL (US); Andrew N. Baines, Rockton, IL (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 344 days.

(21) Appl. No.: 15/650,628

(22) Filed: Jul. 14, 2017

(65) Prior Publication Data
US 2019/0017492 A1 Jan. 17, 2019

(51) Int. Cl.
| | |
|---|---|
| *B64D 41/00* | (2006.01) |
| *B33Y 80/00* | (2015.01) |
| *F01D 5/14* | (2006.01) |
| *F01D 5/18* | (2006.01) |

(52) U.S. Cl.
CPC ........... *B64D 41/007* (2013.01); *B33Y 80/00* (2014.12); *F01D 5/147* (2013.01); *F01D 5/18* (2013.01); *F05B 2220/31* (2013.01); *F05B 2230/30* (2013.01); *F05B 2230/50* (2013.01); *F05B 2240/301* (2013.01); *F05B 2250/283* (2013.01); *F05D 2220/34* (2013.01)

(58) Field of Classification Search
CPC .......................... F05B 2220/31; F05D 2220/34
See application file for complete search history.

(56) References Cited

U.S. PATENT DOCUMENTS

| | | | | |
|---|---|---|---|---|
| 4,664,600 A | * | 5/1987 | Perry ...................... | B64C 11/26 |
| | | | | 416/224 |
| 4,834,616 A | * | 5/1989 | Kasarsky ................ | F01D 5/282 |
| | | | | 29/889.21 |
| 5,314,309 A | * | 5/1994 | Blakeley ............... | B29C 70/081 |
| | | | | 264/135 |
| 5,725,355 A | * | 3/1998 | Crall ....................... | F01D 5/147 |
| | | | | 416/229 A |
| 7,144,222 B2 | | 12/2006 | Lanni et al. | |
| 8,123,489 B2 | * | 2/2012 | Udall ....................... | F01D 5/147 |
| | | | | 416/233 |
| 9,121,287 B2 | | 9/2015 | Weisse et al. | |
| 9,188,105 B2 | * | 11/2015 | Bortoli ................. | B64D 41/007 |
| 2016/0115822 A1 | | 4/2016 | Cortequisse | |

FOREIGN PATENT DOCUMENTS

| | | |
|---|---|---|
| DE | 102012018871 A1 | 3/2014 |
| WO | 2016134478 A1 | 9/2016 |
| WO | 2017092764 A1 | 6/2017 |

OTHER PUBLICATIONS

Search Report dated Dec. 4, 2018 in U310968EP, EP Search Application No. 18183641.2, 7 pages.

* cited by examiner

*Primary Examiner* — Woody A Lee, Jr.
*Assistant Examiner* — Jason G Davis
(74) *Attorney, Agent, or Firm* — Cantor Colburn LLP

(57) ABSTRACT

A ram air turbine (RAT) is provided and includes a turbine assembly including blades and a hub to which the blades are connected, a generator or a pump and a drivetrain mechanically interposed between the turbine assembly and the generator or the pump. Each blade includes an exterior, airfoil-shaped structure defining an interior and support structures disposed within the interior which connect with an inner surface of the exterior, airfoil-shaped structure and which define hollow regions within the interior.

11 Claims, 4 Drawing Sheets

FIG. 2
FIG. 3A
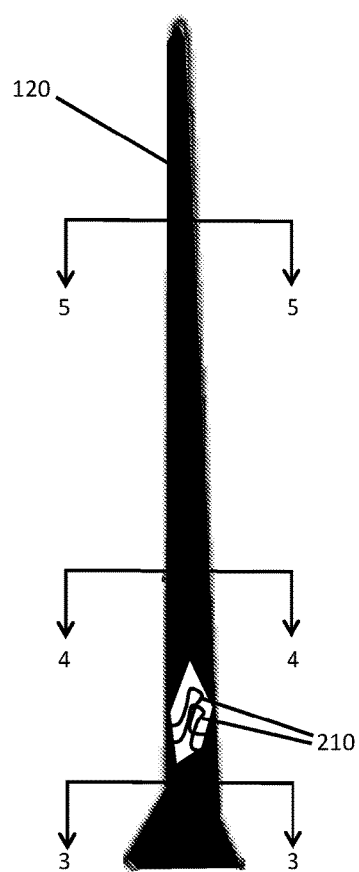
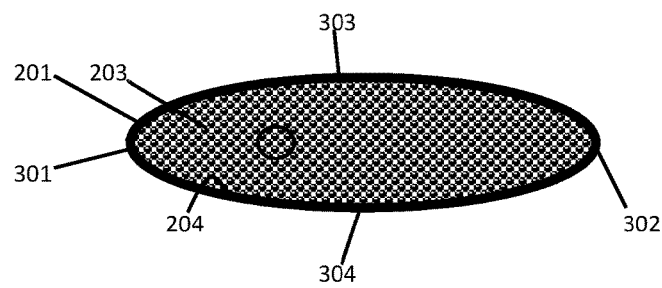
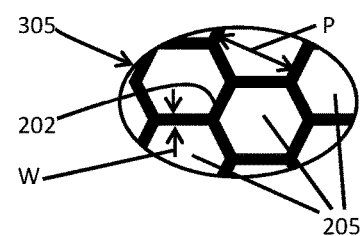
FIG. 3B

RAM AIR TURBINE BLADES

BACKGROUND

The following description relates to ram air turbine (RAT) blades and, more specifically, to 3D printed RAT blades with honeycomb cores.

A RAT is an aircraft-mounted device that is used to extract power from an airstream for emergency or other use. A RAT typically includes a rotating turbine mounted to a strut, a driveshaft/driveline potentially including a gearbox, a power generation device that is typically an electrical generator, a hydraulic pump or both and ancillary equipment such as a stow abort mechanism, bonding straps, a turbine release cable, a proximity sensor, etc. Certain types of RATs may be mounted to in-flight refueling or weapons pods for military use.

A RAT blade includes an airfoil and a shank which serves as a transition from an exposed airfoil section to turbine hub internals. The shank is used to retain the blade against centrifugal forces and to control the blade angle. A RAT blade is traditionally manufactured from solid aluminum and can be heavy especially in large blade RAT designs. This heaviness impacts RAT turbine design as explained below.

As an RAT turbine spins, the masses of each of the blade sections generate centrifugal force towards the RAT turbine centerline that is required to provide the required centripetal acceleration. All sections of the blade and particularly lower sections of the blade (i.e., those closer to the hub) must have adequate strength to ensure structural integrity of the blade itself under such centrifugal loads. This drives a need for more blade material and drives increased blade mass. In other words, the blade gains mass just to support its own mass under centrifugal loads. The mass of an entire RAT blade, again acted upon by centrifugal loads, must be reacted by the turbine hub and blade bearings. Higher blade mass drives increased hub mass as well as increased capacity blade bearings, which drives increased mass of the turbine itself. Higher blade mass also drives increased force into the turbine blade bearings, which increases friction. Increased friction in turn compromises turbine governing response and results in a larger turbine speed range. A larger turbine speed range results in higher maximum speed, which drives more stress into the blades and structure exacerbating the issues listed above.

Blade mass also results in a proportional (to mass and to the square of speed) centrifugal turning moment (CTM). This is a turning moment that acts about the blade's axis and tends to drive the blade towards fine pitch. Forces toward fine pitch increase with rotational speed and is counteractive to good governing behavior (a fine pitch blade angle extracts more power from the airstream than a coarse pitch blade, and tends to drive higher turbine speed, which if not counteracted could result in a runaway condition and eventual RAT failure). Hence, the blade CTM must be overcome by a large counterweight mass, packaged inside the hub. Hence, higher blade mass results in higher counterweight mass, which in turn drives higher turbine mass, a larger turbine hub, higher governing friction, and so on.

BRIEF DESCRIPTION

According to an aspect of the disclosure, a ram air turbine (RAT) is provided and includes a turbine assembly including blades and a hub to which the blades are connected, a generator or a pump and a drivetrain mechanically interposed between the turbine assembly and the generator or the pump. Each blade includes an exterior, airfoil-shaped structure defining an interior and support structures disposed within the interior which connect with an inner surface of the exterior, airfoil-shaped structure and which define hollow regions within the interior.

In accordance with additional or alternative embodiments, at least one of the hub, the generator or the pump and the drivetrain are rated for operation with each blade.

In accordance with additional or alternative embodiments, the exterior, airfoil-shaped structure is metallic, tapered with increasing radial distance from the hub and includes a leading edge, a trailing edge opposite the leading edge, a low-pressure surface extending from the leading edge to the trailing edge and a high-pressure surface extending from the leading edge to the trailing edge and opposite the low-pressure surface.

In accordance with additional or alternative embodiments, the support structures include metallic materials.

In accordance with additional or alternative embodiments, the support structures are provided in a honeycomb pattern.

In accordance with additional or alternative embodiments, a pitch between proximal support structures varies with increasing radial distance from the hub.

In accordance with additional or alternative embodiments, widths of the support structures varies with increasing radial distance from the hub.

According to another aspect of the disclosure, a blade of a ram air turbine (RAT) assembly including the blade and at least another blade and a hub to which the blades are connected is provided. The blade includes an exterior, airfoil-shaped structure defining an interior and support structures disposed within the interior. The support structures are connected with an inner surface of the exterior, airfoil-shaped structure and are configured to define hollow regions within the interior.

In accordance with additional or alternative embodiments, the exterior, airfoil-shaped structure is metallic, tapered with increasing radial distance from the hub and includes a leading edge, a trailing edge opposite the leading edge, a low-pressure surface extending from the leading edge to the trailing edge and a high-pressure surface extending from the leading edge to the trailing edge and opposite the low-pressure surface.

In accordance with additional or alternative embodiments, the support structures include metallic materials.

In accordance with additional or alternative embodiments, the support structures are provided in a honeycomb pattern.

In accordance with additional or alternative embodiments, a pitch between proximal support structures varies with increasing radial distance from the hub.

In accordance with additional or alternative embodiments, widths of the support structures varies with increasing radial distance from the hub.

According to yet another aspect of the disclosure, a method of forming a blade for a ram air turbine (RAT) assembly is provided. The RAT assembly includes the blade and at least another blade and a hub to which the blades are connected, a generator or a pump and a drivetrain mechanically interposed between the RAT assembly and the generator or the pump. The method of forming the blade include compiling external specifications describing an exterior, airfoil-shape of the blade, loading the external specifications into an additive manufacturing device, instructing the additive manufacturing device to form a structure having the exterior, airfoil-shape such that the structure defines an interior and instructing the additive manufacturing device to dispose support structures within the interior such that the support structures connect with an inner surface of the structure and such that the support structures define hollow regions within the interior.

In accordance with additional or alternative embodiments, the method includes re-designing at least one of the hub, the generator or the pump and the drivetrain in accordance with the structure and the support structures formed by the additive manufacturing device.

In accordance with additional or alternative embodiments, the instructing of the additive manufacturing device to form the structure includes instructing the additive manufacturing device to form the structure with metallic materials, instructing the additive manufacturing device to taper the structure with increasing radial distance from the hub and instructing the additive manufacturing device to form the structure to include a leading edge, a trailing edge opposite the leading edge, a low-pressure surface extending from the leading edge to the trailing edge and a high-pressure surface extending from the leading edge to the trailing edge and opposite the low-pressure surface.

In accordance with additional or alternative embodiments, the method further includes instructing the additive manufacturing device to form the support structures with metallic materials.

In accordance with additional or alternative embodiments, the method further includes instructing the additive manufacturing device to form the support structures in a honeycomb pattern.

In accordance with additional or alternative embodiments, the method further includes instructing the additive manufacturing device to vary a pitch between proximal support structures with increasing radial distance from the hub.

In accordance with additional or alternative embodiments, the method further includes instructing the additive manufacturing device to vary widths of support structures with increasing radial distance from the hub.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIG. 2 is an enlarged side view of a RAT turbine blade of the RAT assembly and a partially cutaway view of a portion thereof in accordance with embodiments;

FIG. 3A is a cross-sectional view of a portion of the RAT turbine blade of FIG. 2 proximate to a hub that is taken along lines 3-3;

FIG. 3B is an enlarged view of the encircled portion of FIG. 3A;

DETAILED DESCRIPTION

Increased RAT turbine mass tends to reduce RAT natural frequencies. Good RAT design practice strives to maintain a RAT system's first natural frequency above an operating speed range and with an adequate speed margin. Hence, blade mass and all the consequent effects tend to degrade critical speed margins. Blade resonant response (flutter) is also related to blade mass. A lighter blade, or even a 'tuned' blade, with mass and stiffness/strength located in specific/desired areas could help to avoid flutter responses of the blade design by operating below the blade natural frequency, or by tuning the blade design (stiffness, mass distribution) to ensure that the RAT governing speed is between blade natural frequencies. Overall, increased turbine blade mass drives increased RAT turbine mass, increased RAT hub diameter, degrades governing performance and degrades natural frequency margins. Indeed, RAT turbine blade mass is a very significant driver to turbine sizing and mass. Reduced mass RAT turbine blade designs, therefore, could provide very significant benefits including for example RAT designs which are smaller, lighter, have reduced governing speed ranges and improved critical speed margins.

Thus, as will be described below, a RAT blade is provided with reduced mass. The mass reductions are achieved through a change in design approach from a solid material structure to a 3D printed hollow core and skin configuration. The core could be a honeycomb or similar structure which could be optimized to greater or lesser density (i.e., honeycomb size and spacing), and may include ribs of varying thicknesses. In this way, a density and strength of the RAT blade could be tailored to specific design needs in different areas of the RAT blade for optimum results. The use of 3D printing provides for a way to manufacture the proposed complex RAT blade configuration with a seamless printed material construction and negates the need to manufacture a separate core structure to which a skin would need to be affixed. This approach offers potential benefits in terms of cost (manufacturability/time), and in terms of strength/stress/integrity. In addition, the blade root/shank area could be printed as part of a single structure with the airfoil, or could be produced separately and attached to the airfoil (e.g., by welding or similar processes).

Figure 1:
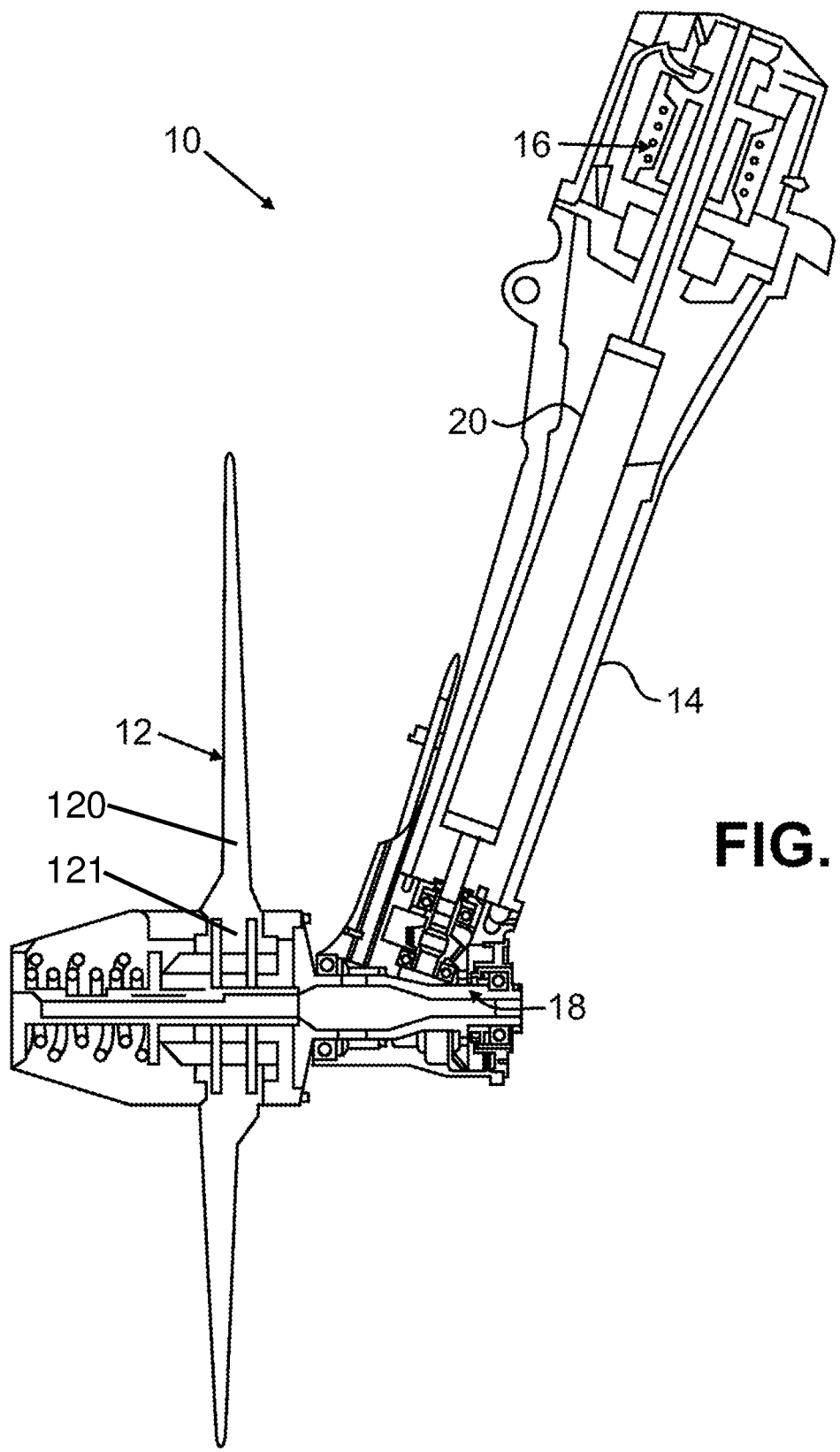
FIG. 1 is a schematic side view of a ram air turbine (RAT) assembly and system in accordance with embodiments.

With reference to FIG. 1, a cross-sectional view of a ram air turbine (RAT) 10 for use with an aircraft (not shown) is provided. The RAT 10 includes a turbine assembly 12, a strut 14, a generator or a pump 16 (hereinafter referred to as a generator 16) and a drivetrain (or driveline) 18 that includes a strut driveshaft 20. In various embodiments, the turbine assembly 12 can include RAT turbine blades 120, a hub 121, a hub locking mechanism, suitable pitch or speed control mechanisms, a gearbox, etc. The strut 14 provides structural support of the RAT 10 and helps support the turbine assembly 12. In the illustrated embodiment, the strut 14 has a hollow and generally cylindrical shape. Moreover, in the illustrated embodiment, the generator 16 is positioned at a proximal end of the strut opposite the turbine assembly 12. It should be noted that the generator 16 is merely one form of power conversion device that can be used with the RAT 10, and is shown merely by way of example and not limitation. For instance, a hydraulic pump can be used in place of or in addition to the generator 16 in further embodiments. The drivetrain 18 includes suitable shafts and gearing to provide a mechanical connection between the turbine assembly 12 and the generator 16, in order to transmit rotational energy (torque) to the generator 16. The strut driveshaft 20 is part of the drivetrain 18, and is positioned at least partially within the strut 14. The strut driveshaft 20 can directly engage the generator 16, and can engage suitable gearing that mates with the turbine assembly 12. In one embodiment, the turbine is configured to have an operating range of approximately 3,800-5,000 RPM (or 63.33-83.33 Hz), with suitable gearing providing a gear ratio to operate the strut driveshaft 20 and the generator 16 at an operating range of approximately 8,000-12,000 RPM (133-200 Hz).

The RAT 10 in the illustrated embodiment is configured to be selectively deployable from fuselage of the aircraft using suitable actuators (not shown). When deployed, the RAT 10 presents the turbine assembly 12 to airflow passing the aircraft, and can be used to generate desired forms of power using kinetic energy from rotation of components of the turbine assembly 12 produced by the passing airflow. The RAT 10 can be deployed in-flight to provide emergency or secondary power.

With reference to FIGS. 2, 3A, 3B, 4A, 4B, 5A and 5B, each RAT turbine blade 120 includes an exterior, airfoil-shaped structure 201 and support structures 202. The exterior, airfoil-shaped structure 201 is formed to define an interior 203 that is partially hollow as will be described below and the support structures 202 are disposed within the interior 203. The support structures 202 connect with an inner surface 204 of the exterior, airfoil-shaped structure 201 and are formed to define hollow regions 205 within the interior 203.

As such, while conventional RAT blades are formed from solid metallic blocks that are machined into blade forms but are otherwise solid during operational use, each RAT turbine blade 120 has a same external shape as a conventional RAT blade but is at least partially hollow inside. Thus, each RAT turbine blade 120 is lighter than the conventional version thereof. Therefore, since at least one of the hub 121, the generator 16 and the drivetrain 18 are rated for operation with each RAT turbine blade 120, at least one of the hub 121, the generator 16 and the drivetrain 18 can be re-designed in accordance with the external shape and weight of each RAT turbine blade 120.

In accordance with embodiments, the exterior, airfoil-shaped structure 201 is metallic, tapered with increasing radial distance from the hub 121 (see the tapering of FIG. 2 and the relative decrease in area of the cross-sections of FIGS. 3A, 4A and 4B) and includes a leading edge 301, a trailing edge 302 that is opposite the leading edge 301, a low-pressure surface 303 that extends from the leading edge 301 to the trailing edge 302 and a high-pressure surface 304 that extends from the leading edge 301 to the trailing edge 302 and is opposite the low-pressure surface 303 (see FIG. 3A).

Figure 4A:
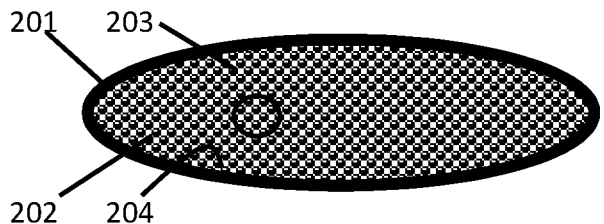
FIG. 4A is a cross-sectional view of a portion of the RAT turbine blade of FIG. 2 that is taken along lines 4-4.
Figure 4B:
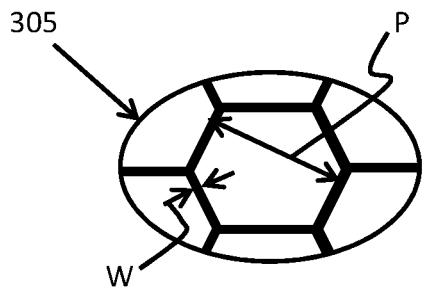
FIG. 4B is an enlarged view of the encircled portion of FIG. 4A.
Figure 5A:
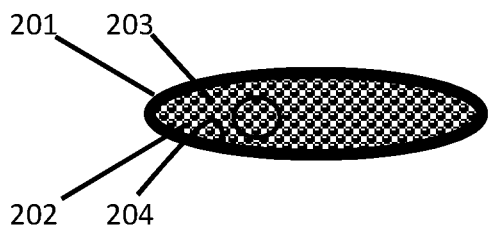
FIG. 5A is a cross-sectional view of a portion of the RAT turbine blade of FIG. 2 that is taken along lines 5-5.
Figure 5B:
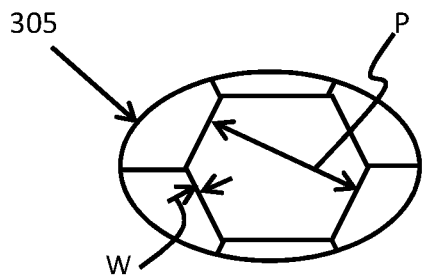
FIG. 5B is an enlarged view of the encircled portion of FIG. 5A.

In accordance with further embodiments, the support structures 202 may include or be formed of metallic materials and may be provided in a honeycomb pattern 305 (see FIG. 3B). As shown in FIGS. 3B, 4B and 5B, a pitch P between proximal support structures 202 may vary with increasing radial distance from the hub 121 and widths W of the support structures 202 may also vary (dependently or independently from the varying pitch P) with increasing radial distance from the hub 121. The varying pitch P and the varying widths W allows the support structures 202 to be designed such that the support structures 202 are strongest at or proximate to the hub 121 where the most significant centrifugal forces are reacted to and such that the support structures 202 are lightest at or proximate to the tip 206 of each RAT turbine blade 120 so as to limit their contribution to the centrifugal forces.

While the honeycomb pattern 305 is illustrated in FIGS. 3B, 4B and 5B as being oriented transversely with respect to radial distance from the hub 121, it is to be understood that this is not required and that the honeycomb pattern 305 or any other pattern of the support structures 202 may be oriented in any direction deemed appropriate to react to centrifugal forces. For example, the honeycomb pattern 305 may be oriented in parallel with respect to radial distance from the hub 121.

Figure 6:
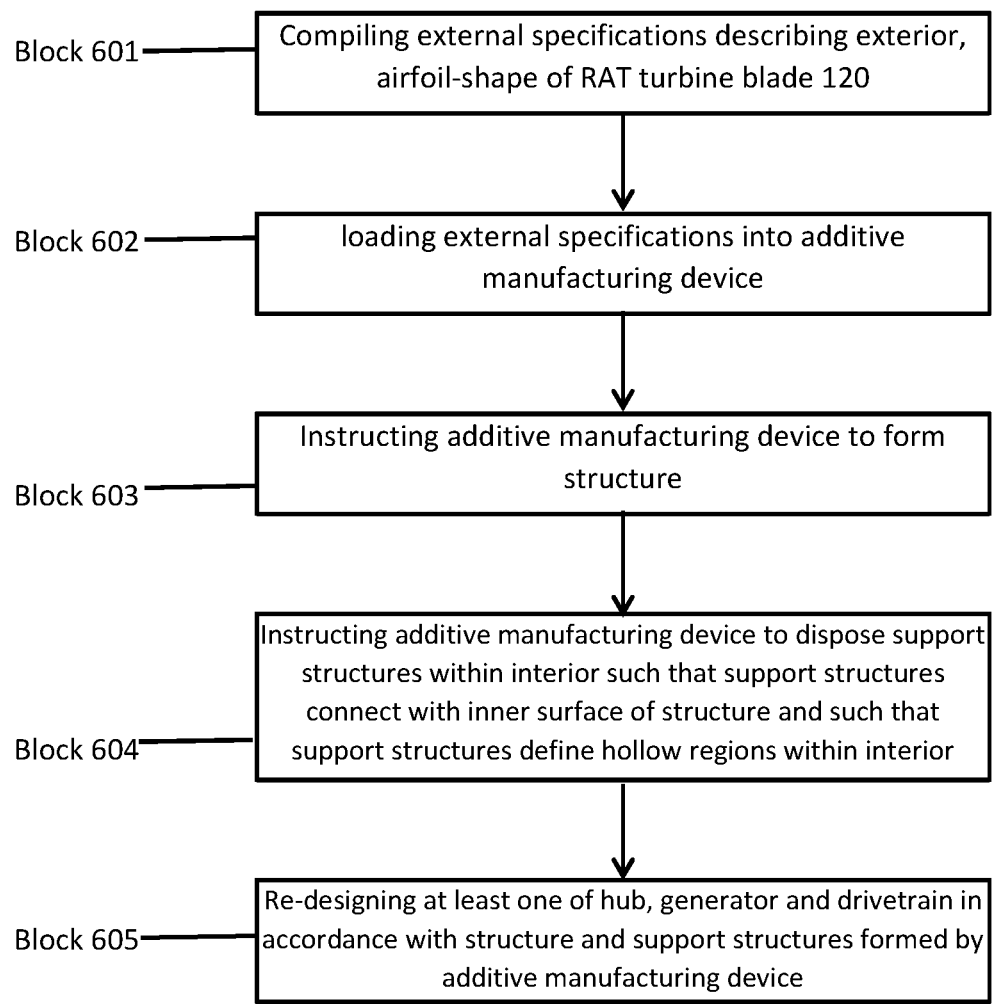
FIG. 6 is a flow diagram illustrating a method of forming a blade of a RAT assembly in accordance with embodiments.

With reference to FIG. 6, a method of forming each RAT turbine blade 120 is provided. As shown in FIG. 6, the method does not require or otherwise call for a re-design of the outer or external shape of the RAT turbine blade 120 and thus includes compiling external specifications describing an exterior, airfoil-shape of the RAT turbine blade 120 which are already designed and understood (block 601). The method further includes loading the external specifications into an additive manufacturing device, such as a 3D printer that is capable of any one or more of several known 3D printing processes, such as direct metal laser sintering (DMLS) (block 602) and instructing the additive manufacturing device to form the structure 201 having the exterior, airfoil-shape such that the structure 201 defines the interior 203 (block 603). In addition, the method includes instructing the additive manufacturing device to dispose the support structures 202 within the interior 203 such that the support structures 202 connect with the inner surface 204 of the structure 201 and such that the support structures 202 define the hollow regions 205 within the interior 203 (block 604).

In accordance with embodiments, the method may further include re-designing at least one of the hub 121, the generator 16 and the drivetrain 18 in accordance with the structure 201 and the support structures 202 formed by the additive manufacturing device (block 605) and the instructing of the additive manufacturing device to form the structure 202 of block 603 may include instructing the additive manufacturing device to form the structure 202 with metallic materials, to taper the structure 202 with increasing radial distance from the hub 121 and to form the structure 202 to include the leading edge 301, the trailing edge 302, the low-pressure surface 303 and the high-pressure surface 304.

With continued reference to FIG. 6, the method may also include instructing the additive manufacturing device to form the support structures 202 with metallic materials, instructing the additive manufacturing device to form the support structures 202 in the honeycomb pattern 305, instructing the additive manufacturing device to vary the pitch P between proximal support structures 202 with increasing radial distance from the hub 121 and instructing the additive manufacturing device to independently vary the widths W of the support structures 202 with increasing radial distance from the hub 121.

In accordance with embodiments, the use of the 3D printing enabled by the additive manufacturing device provides for the optional formation of complex shapes for at least some of the support structures 202. For example, with reference to FIG. 2, complex support structures 210 are illustrated as being proximate to the hub 121. These complex support structures 210 may include features such as three-dimensional overlapping and irregular curvatures and thus may only be formable in a reasonably simple and reproducible manner by way of 3D printing processes.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A ram air turbine (RAT), comprising:
   a turbine assembly comprising blades and a hub to which the blades are connected;
   a generator or a pump; and
   a drivetrain mechanically interposed between the turbine assembly and the generator or the pump,
   each blade comprising:
   an exterior, airfoil-shaped structure defining an interior; and
   support structures disposed within the interior which connect with an inner surface of the exterior, airfoil-shaped structure and which define hollow regions within the interior,
   wherein at least one of:
   a pitch between adjacent support structures varies with increasing radial distance from the hub, and
   widths of the support structures vary with increasing radial distance from the hub.

2. The RAT according to claim 1, wherein at least one of the hub, the generator or the pump and the drivetrain are rated for operation with each blade.

3. The RAT according to claim 1, wherein the exterior, airfoil-shaped structure is metallic, tapered with increasing radial distance from the hub and comprises:
   a leading edge;
   a trailing edge opposite the leading edge;
   a low-pressure surface extending from the leading edge to the trailing edge; and
   a high-pressure surface extending from the leading edge to the trailing edge and opposite the low-pressure surface.

4. The RAT according to claim 1, wherein the support structures comprise metallic materials.

5. The RAT according to claim 1, wherein the pitch between adjacent support structures varies with increasing radial distance from the hub and the widths of the support structures remain constant with increasing radial distance from the hub.

6. The RAT according to claim 1, wherein the widths of the support structures varies with increasing radial distance from the hub and the pitch between adjacent support structures remains constant with increasing radial distance from the hub.

7. A blade of a ram air turbine (RAT) assembly, the RAT comprising the blade and at least another blade and a hub to which the blades are connected, the blade comprising:
   an exterior, airfoil-shaped structure defining an interior; and
   support structures disposed within the interior,
   the support structures being connecting with an inner surface of the exterior, airfoil-shaped structure and being configured to define hollow regions within the interior,
   wherein at least one of:
   a pitch between adjacent support structures varies with increasing radial distance from the hub, and
   widths of the support structures vary with increasing radial distance from the hub.

8. The blade according to claim 7, wherein the exterior, airfoil-shaped structure is metallic, tapered with increasing radial distance from the hub and comprises:
   a leading edge;
   a trailing edge opposite the leading edge;
   a low-pressure surface extending from the leading edge to the trailing edge; and
   a high-pressure surface extending from the leading edge to the trailing edge and opposite the low-pressure surface.

9. The blade according to claim 7, wherein the support structures comprise metallic materials.

10. The blade according to claim 7, wherein the pitch between adjacent support structures varies with increasing radial distance from the hub and the widths of the support structures remain constant with increasing radial distance from the hub.

11. The blade according to claim 7, wherein the widths of the support structures varies with increasing radial distance from the hub and the pitch between adjacent support structures remains constant with increasing radial distance from the hub.

* * * * *